(12) United States Patent
Kato et al.

(10) Patent No.: US 7,715,293 B2
(45) Date of Patent: May 11, 2010

(54) OPTICAL RECORDING MEDIUM AND METHOD OF RECORDING TO THE SAME

(75) Inventors: Masaki Kato, Sagamihara (JP); Kazunori Ito, Yokohama (JP); Hiroshi Deguchi, Yokohama (JP); Hiroko Ohkura, Yokohama (JP); Mikiko Abe, Kawasaki (JP); Hiroyoshi Sekiguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 798 days.

(21) Appl. No.: 11/371,463

(22) Filed: Mar. 8, 2006

(65) Prior Publication Data

US 2006/0209658 A1 Sep. 21, 2006

(30) Foreign Application Priority Data

Mar. 16, 2005 (JP) ............................. 2005-074846

(51) Int. Cl.
*G11B 7/0045* (2006.01)

(52) U.S. Cl. .................................................. 369/59.12

(58) Field of Classification Search ........................ None
See application file for complete search history.

(56) References Cited

U.S. PATENT DOCUMENTS

| | | | |
|---|---|---|---|
| 6,205,102 B1 * | 3/2001 | Spruit | ..................... 369/59.11 |
| 6,592,958 B2 | 7/2003 | Nakamura et al. | |
| 6,757,232 B2 | 6/2004 | Yamada et al. | |
| 6,975,577 B2 | 12/2005 | Kato | |
| 2003/0044719 A1 | 3/2003 | Katoh et al. | |
| 2003/0214888 A1 | 11/2003 | Kato et al. | |
| 2003/0214902 A1 | 11/2003 | Yamada et al. | |
| 2003/0227850 A1 | 12/2003 | Kato et al. | |
| 2004/0017755 A1 | 1/2004 | Kato | |
| 2004/0115559 A1 | 6/2004 | Kato et al. | |
| 2004/0213122 A1 | 10/2004 | Yamada et al. | |
| 2005/0078587 A1 | 4/2005 | Narumi et al. | |
| 2009/0046550 A1 * | 2/2009 | Kato et al. | ................ 369/44.33 |
| 2009/0116365 A1 * | 5/2009 | Ito et al. | ..................... 369/116 |

FOREIGN PATENT DOCUMENTS

| | | |
|---|---|---|
| JP | 2000-322740 | 11/2000 |
| JP | 2001-118245 | 4/2001 |
| JP | 2001-243626 | 9/2001 |
| JP | 2003-281722 | 10/2003 |
| JP | 2005-078662 | 3/2005 |

* cited by examiner

*Primary Examiner*—Joseph H Feild
*Assistant Examiner*—Parul Gupta
(74) *Attorney, Agent, or Firm*—Cooper & Dunham LLP (57) ABSTRACT

To provide a method of recording information to an optical recording medium comprising recording a mark of time length nT (n: natural number of 3 or more, T: clock cycle) in an optical recording medium capable of supporting different recording speeds and having constant information line density, and irradiating the optical recording medium, the optical recording medium irradiated with light of alternating $m_1$ heating pulses of power Pw and $m_1$ cooling pulses of power Pc (where $m_1$ is a natural number smaller than n) provided $v < v_0$ (where v is a scanning speed and $v_0$ is a scanning speed unique to each optical recording medium), the optical recording medium irradiated with light of alternating $m_2$ heating pulses of power Pw and $m_2$ cooling pulses of power Pc (where $m_2$ is a natural number smaller than n) provided $v \geq v_0$, wherein the condition $n/m_1 \geq n/m_2$ is satisfied.

15 Claims, 5 Drawing Sheets

OPTICAL RECORDING MEDIUM AND METHOD OF RECORDING TO THE SAME

BACKGROUND OF THE INVENTION

1. Technical Field

This disclosure relates to an optical recording medium (hereinafter referred to as an "optical recording medium," "information recording medium," or "optical disc" in some cases) more particularly to a method of recording to rewritable optical discs such as CD-RWs, DVD-RWs, DVD+RWs and DVD-RAMs in which a phase-change material is used as a recording layer, and to an optical recording medium to which the recording method can be applied.

2. Description of the Related Art

Rewritable optical discs applied with a phase change technology, as typified by CD-RWs, DVD+RWs and DVD-RWs, are widely used for audio-visual purpose and information recording purpose in computers. With an increase in the digital capacity in recent years, the recording speed for these optical discs is also expected to be increased.

High-speed recording for these optical discs using the phase-change technology requires excellent rewriting performance both at higher scanning speeds and in a broader scanning speed range—the former corresponds to the maximum recording speed and the latter to the speed range inside of which recording is possible. For the latter, in particular, a speed ratio of about 2.4:1 (maximum speed: minimum speed) is required to support the CAV (Constant Angular Velocity) recording, a technology that is necessary for the acceleration of random access recording. In the CAV recording, the scanning speed v varies with the recording radial position r, i.e., v/r=constant, and thus recording needs to be possible at any recording speed below the maximum recording speed. Furthermore, the higher the maximum speed, the broader the scanning speed range, inevitably, e.g., 4×DVD+RW discs require a scanning speed range of 5.8 m/s to 14.0 m/s to support the CAV recording. Thus, further development is required for optical recording media and recording methods, so that recording is possible in an extremely broader speed range from 11.6 m/s to 27.9 m/s to support 8× recording.

Meanwhile, for the increased maximum recording speed, a recording layer material needs to be changed to a material that is more suitable for high-speed recording. Phase-change materials are generally used as the recording layer material of optical discs typified by DVD-RWs and CD-RWs. For such phase-change materials, alloys that can switch between an amorphous state and a crystalline state in a reversible manner are generally used. To achieve speed up, phase-change materials that rapidly switch from an amorphous state to a crystalline state, i.e., those with high crystallization rates need to be used. Increasing the crystallization rate, however, makes the control of the crystalline state at low-speed recording very difficult. For this reason, a major recording method (or write strategy) change needs to be made between the speed range close to the maximum and the speed range close to the minimum. Thus, using recording layer materials that support high-speed recording makes it very difficult to achieve recording at any recording speed below the maximum speed.

Examples of related art which may be associated with the present invention are as follows: for example, Japanese Patent Application Laid-Open (JP-A) No. 2005-78662 discloses an optical information recording method and an apparatus, where the delay amount of the first pulse is changed in the CAV recording by using a 2T strategy, and also discloses the fact that parameters are set for recording speed using linear functions; JP-A No. 2000-322740 discloses a method of recording to an optical recording medium, where parameters are set for recording speed using linear functions; and JP-A No. 2001-118245, JP-A No. 2001-243626, "DVD+ReWritable 4.7 Gbytes Basic Format Specifications System Description version 1.2" and "Recordable Compact Disc Systems Part III, volume 2, version 1.1" disclose an information recording method for setting parameters for recording speed using linear functions, an apparatus, and a technology for changing the parameters stepwise.

The related arts described above all fail to describe discontinuous pulse change, which is the feature of the present invention.

In addition, although JP-A No. 2003-281722 discloses a technology for changing the pulse number depending on the speed range for recording, its setting is totally opposite of the setting disclosed in the present invention; therefore it never reveals the present invention.

BRIEF SUMMARY

There are provided in this disclosure a method of recording to a rewritable optical recording medium (or write strategy) to which the phase-change technology is applied and where recording is possible at a maximum recording speed of more than 8× DVD+RW recording, i.e., to provide the CAV recording method that enables recording at any recording speed below the maximum recording speed, and an optical recording medium to which the recording method can be applied.

In a first aspect in this disclosure of a method for recording to an optical recording medium, information is recorded in an optical recording medium which can support different recording speeds and has a constant information line density. The method includes recording a mark of time length nT (where n is a natural number of 3 or more, and T represents a clock cycle) therein, and irradiating the optical recording medium, the optical recording medium being irradiated with light of alternating in; heating pulses of power Pw and $m_1$ cooling pulses of power Pc (where $m_1$ is a natural number smaller than n) provided $v<v_0$ (where v is a scanning speed and $v_0$ is a scanning speed which is unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_0$, wherein the condition $n/m_1 \geq n/m_2$ is satisfied.

In a second aspect in this disclosure of a method for recording to an optical recording medium, information is recorded in an optical recording medium which can support different recording speeds and has a constant information line density. The method includes recording a mark of time length nT (where n is a natural number of 3 or more, and T represents a clock cycle) therein, and irradiating the optical recording medium, the optical recording medium being irradiated with light of alternating $m_1$ heating pulses of power Pw and $m_1$ cooling pulses of power Pc (where $m_1$ is a natural number smaller than n) provided $v_1 \leq v < v_2$ (where v is a scanning speed, and $v_1$ and $v_2$ are scanning speeds which are unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_2$ and $v<v_1$, wherein the condition $n/m_1 \geq n/m_2$ is satisfied.

In a first aspect of this disclosure, a substrate of the optical recording medium has a guide groove in which information that allows at least one of $v_0$, $m_1$ and $m_2$ to be univocally determined is pre-formatted.

In a second aspect of this disclosure, a substrate of the optical recording medium has a guide groove in which information that allows at least one of $v_1$, $v_2$, $m_1$ and $m_2$ to be univocally determined is pre-formatted.

DESCRIPTION OF THE PREFERRED EMBODIMENTS

Optical Recording Medium and Method of Recording to the Optical Recording Medium In the first aspect of the method of the present invention for recording to an optical recording medium, information is recorded in an optical recording medium which can support different recording speeds and has a constant information line density. The method includes recording a mark of time length nT (where n is a natural number of 3 or more, and T represents a clock cycle) therein, and irradiating the optical recording medium, the optical recording medium being irradiated with light of alternating $m_1$ heating pulses of power Pw and $m_1$ cooling pulses of power Pc (where $m_1$ is a natural number smaller than n) provided $v<v_0$ (where v is a scanning speed and $v_0$ is a scanning speed which is unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_0$, wherein the condition $n/m_1 \geq n/m_2$ is satisfied.

The first aspect of the optical recording medium of the present invention is used for the method according to the first aspect of the present invention for recording to an optical recording medium, wherein a substrate of the optical recording medium has a guide groove in which information that allows at least one of $v_0$, $m_1$ and $m_2$ to be univocally determined is pre-formatted.

In the second aspect of the method of the present invention for recording to an optical recording medium, information is recorded in an optical recording medium which can support different recording speeds and has a constant information line density. The method includes recording a mark of time length nT (where n is a natural number of 3 or more, and T represents a clock cycle) therein, and irradiating the optical recording medium, the optical recording medium being irradiated with light of alternating $m_1$ heating pulses of power Pw and $m_1$ cooling pulses of power Pc (where $m_1$ is a natural number smaller than n) provided $v_1 \leq v<v_2$ (where v is a scanning speed, and $v_1$ and $v_2$ are scanning speeds which are unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_2$ and $v<v_1$, wherein the condition $n/m_1 \geq n/m_2$ is satisfied.

The second aspect of the optical recording medium of the present invention is used for the method according to the second aspect of the present invention for recording to an optical recording medium, wherein a substrate of the optical recording medium has a guide groove in which information that allows at least one of $v_1$, $v_2$, $m_1$ and $m_2$ to be univocally determined is pre-formatted.

Hereinafter, the details of the optical recording medium of the present invention will also be revealed through a description of the method of the present invention for recording to an optical recording medium.

An optical recording medium to which the recording method of the present invention is applied is an optical recording medium that needs to have a constant information line density and needs to be recordable and rewritable at different recording speeds. For information recording, the pulse-width modulation mode is preferably used in which marks of time length nT (where n is a natural number and T is a clock cycle) and spaces between the marks are recorded as information, and the RLL (Run Length Limited) mode has been generally used in optical discs; examples thereof include EFM used in CD-RWs, and EFMPlus used in DVD+RWs and DVD-RWs. In this case the recording speed v and the clock cycle T preferably satisfies the condition v×T=constant to keep the information line density constant. Moreover, v and r (radial position on the disc) preferably satisfy the condition v/r=constant in order to support the CAV recording. Accordingly, an optical recording medium is preferably recordable at any speed below the maximum recording speed $v_H$ and above the minimum recording speed $v_L$ to achieve the CAV recording at any radial position. It is more preferable that the condition $v_H/v_L \geq 2.4$ be satisfied for 120 mm-diameter optical discs typified by CDs and DVDs.

Information is recorded in an optical recording medium to which the recording method of the present invention is applied, by irradiating and scanning it with an intensity-modulated light at the vicinity of its recording layer to transform it from a crystalline state into an amorphous state to form amorphous marks. Moreover, for the optical recording medium to which the recording method of the present invention is applied, optical discs using a recording layer material with a high crystallization rate are preferable, and those which can achieve a maximum recording speed $v_H$ of 20 m/s or above are more preferable.

Information is recorded in these optical recording media that support high-speed recording, by irradiating and scanning them with an intensity-modulated light as described above. These recording methods are generally referred to as "write strategies".

When forming a recording mark of time length nT, an optical recording medium is irradiated with light of alternating m heating pulses (of power Pw) and m cooling pulses (of power Pc). At this time, the condition Pw>>Pc is satisfied. Moreover, the power Pw can be arbitrarily changed according to the scanning speed for the recording, but it needs to be set high enough to melt the recording layer. The power Pw is preferably in a range of 20 mW to 40 mW to support 8×DVD+RW recording. The power Pc needs to be very low enough to rapidly cool the recording layer melted by the heating pulses; it is preferably in a range of 0 mW to 1 mW.

Although any number can be set for the pulse number m, the mark length can be easily controlled when the condition m<n is satisfied. Moreover, the mark length can be proportional to the pulse number when the condition m=n−k is satisfied (where k is a natural number of 1 or greater), thereby further facilitating the control of mark length. By way of example, the condition m=n−1 is adopted for DVD+RW. If the recording speed is equivalent to 8× DVD+RW recording, the clock cycle T becomes 4.8 ns or less. By contrast, the response time of existent LDs is as long as 1.5 ns or more (10 to 90%) and requires 3 ns or more there and back. Accordingly, loss is large relative to 4.8 ns, a light emission period, resulting in poor heating effect and cooling effect. Thus, it is preferable to decrease m to support high-speed recording with a short clock cycle T.

The 2T strategy adopted by Orange Book Part III, volume 3, version 1.1, which is the US Standard Specification for CD-RW, is provided as an example of a strategy of decreasing m.

Figure 1A:
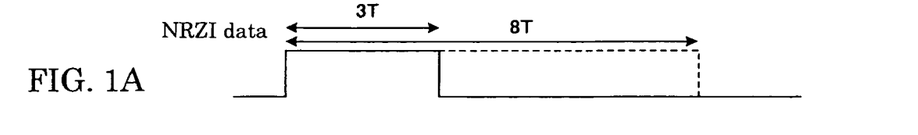
FIG. 1A is a diagram showing NRZI (Non Return to Zero Inverted) data according to an example of a 2T strategy.
Figure 1B:
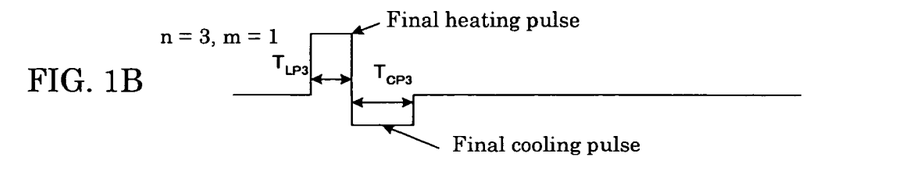
FIG. 1B is a diagram showing NRZI data according to an example of a 2T strategy, where n=3 and m=1.
Figure 1C:
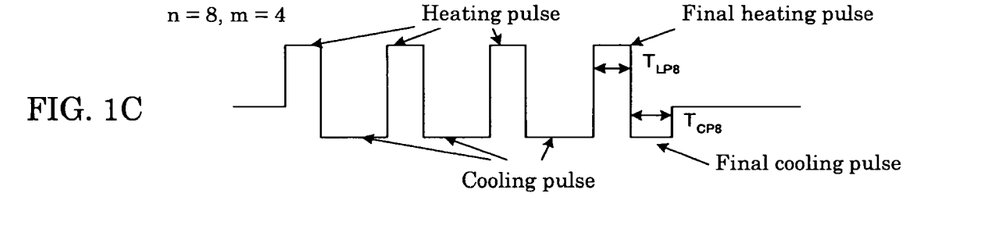
FIG. 1C is a diagram showing NRZI data according to an example of a 2T strategy, where n=8 and m=4.

An example of the 2T strategy is shown in FIG. 1A to FIG. 1C. FIG. 1A shows NRZI data, FIG. 1B shows a case where n=3, m=1, and FIG. 1C shows a case where n=8, m=4. Specifically, in the 2T strategy, the period of the heating pulses becomes about 2T when the condition m=n/2 is satisfied (provided n is an even number) and when the condition m=(n−1)/2 is satisfied (provided n is an odd number). With this, in contrast with the case where m=n−1, it is possible to melt and rapidly cool the recording layer even in high-speed recording with a short clock cycle T. Moreover, it is preferable that the condition m≦n/2 be satisfied in order to support high-speed DVD recording as fast as 8× or greater.

Although any value can be set for the lengths of both the heating pulse and cooling pulse, appropriate values need to be set according to changes in the scanning speed v and in the clock cycle T during recording.

A write strategy for CD-RW that supports 4× to 8× speed recording and rewriting is specified in "Recordable Compact Disc Systems Part III, volume 2, version 1.1", which is the US Standard Specification for CD-RW: at 4× recording (v=4.8 m/s, T=57.9 ns), the heating pulse is 0.2T and the cooling pulse is 0.8T; at 8× recording (v=9.6 m/s, T=28.9 ns), the heating pulse is 0.4T and the cooling pulse is 0.6T; and at 10× recording (v=12.0 m/s, T=23.1 ns), the heating pulse is 0.5T and the cooling pulse is 0.5T. Namely, the faster the recording, the longer the length of the heating pulse relative to the clock cycle and the shorter the length of cooling pulse relative to the clock cycle. Their dependence to v becomes proportional.

"DVD+ReWritable 4.7 Gbytes Basic Format Specifications System Description, version 1.2", the standard specification for DVD+RW, specifies the heating pulse width for 1× to 2.4× recording using an expression proportional to the scanning speed v. Moreover, JP-A No. 2000-322740, JP-A No. 2001-118245 and JP-A No. 2001-243626 suggest that the lengths of both the heating pulse and cooling pulse can be described using optimal recording parameters at any recording speed by describing them with continuous functions of the scanning speed v.

These technologies all suggest that the lengths of both the heating pulse and cooling pulse can be univocally determined once v is determined in a recording speed range of $v_L \leq v \leq v_H$.

These technologies are not, however, applicable in optical recording media using the above-mentioned recording layer material that can support the foregoing specification: $v_H \geq 20$ m/s. For this reason, the crystallization rate of the recording layer material needs to be increased to support high-speed recording. To be more specific, the time during which an optical recording medium is irradiated with light is inevitably shortened (inversely with the scanning speed) by accelerating the scanning speed for recording. As a result, crystallization or amorphization needs to be carried out in a shorter time. Amorphization entails no difficulty because it is carried out by rapidly cooling the recording layer and because the recording layer tends to cool more readily at a higher scanning speed, whereas crystallization involves a gradual cooling operation and it becomes difficult to perform crystallization if the irradiation time is shortened. For this reason, it is required that the crystallization be completed in a shorter irradiation time by increasing the crystallization rate of the recording layer material.

A slight difference in recording conditions tends to cause abnormal crystal growth in the recording layer material with such a high crystallization rate. An example of abnormal crystal growth is schematically shown in FIG. 2A.

Figure 2A:
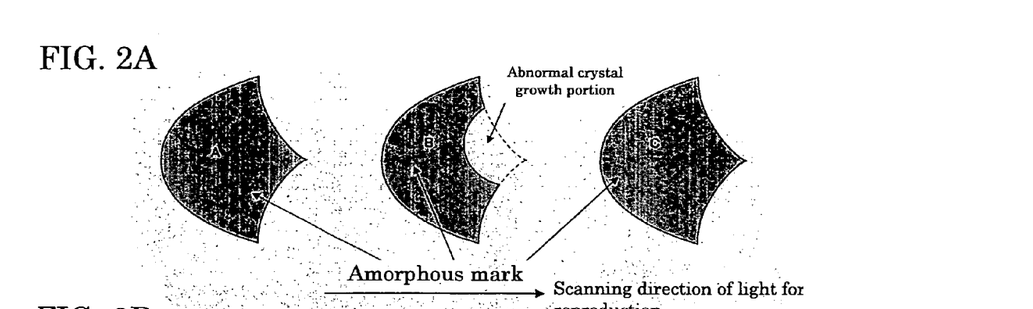
FIG. 2A is a schematic diagram of an example of abnormal crystal growth, showing the shapes of recording marks after recording a single pattern with alternating 3T marks and 3T spaces using the write strategy shown in FIG. 1B.
Figures 2B, 2C:
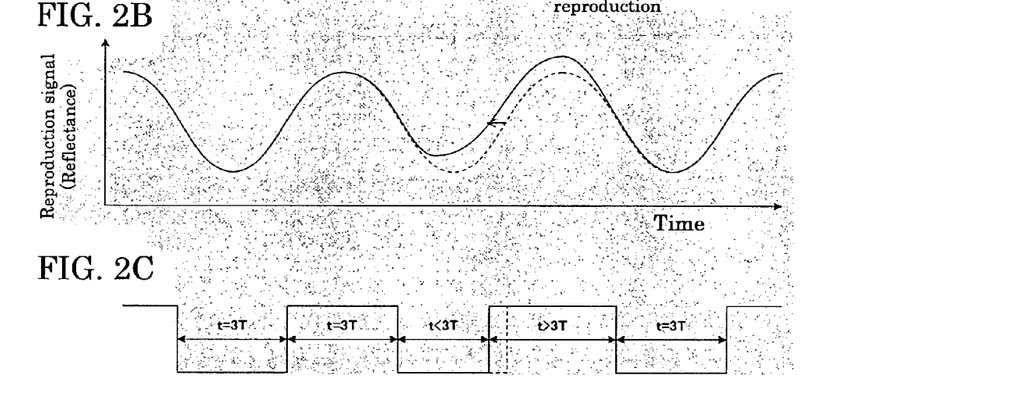
FIG. 2B is a diagram showing a reproduction signal in a case where abnormal crystal growth as shown in FIG. 2A has occurred.
FIG. 2C is a diagram showing a signal obtained by binarizing the reproduction signal shown in FIG. 2B.

The shapes of recording marks in a single recording mark with alternating 3T marks and 3T spaces, recorded by a write strategy shown in FIG. 1B, are shown in FIG. 2A (the mark shapes can be observed using a transmission electron microscope). Although mark A and mark C are normal recording marks, abnormal crystal growth has occurred at the end of mark B. In case of such abnormal crystal growth, a reproduction signal deviates from the normal line (dotted line) as shown in FIG. 2B. As a result, the shape of a binarized signal is like that shown in FIG. 2C, and only the mark B, where abnormal crystal growth has occurred, is reproduced for a time shorter than 3T.

Figure 3:
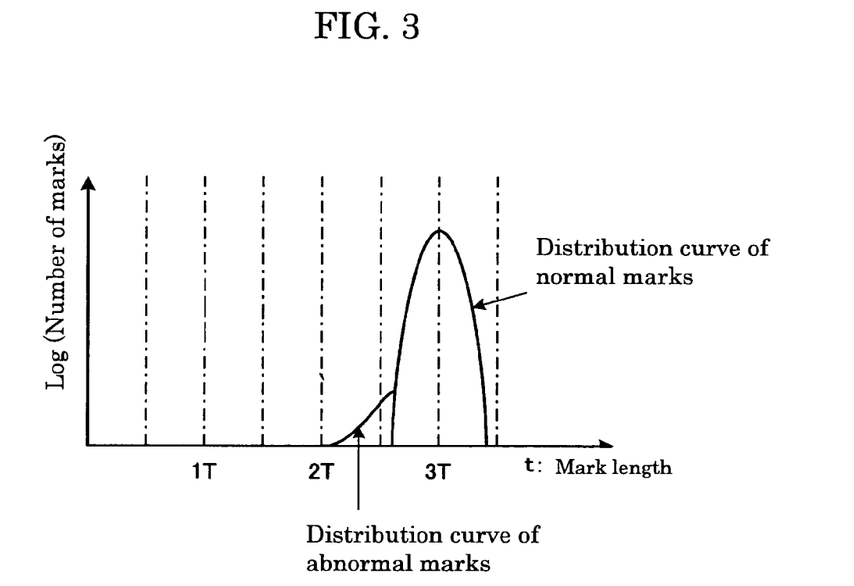
FIG. 3 is a graph showing the result of measurement of the binarized signal shown in FIG. 2C, performed by using a TIA (Time Interval Analyzer) for the analysis of the level of mark B shown in FIG. 2A.

A measurement of the binarized signal shown in FIG. 2C made by using a TIA (Time Interval Analyzer) for the analysis of the level of mark B leads to a result as shown in FIG. 3. Specifically, the obtained distribution curve can be categorized into two components: a component with normal distribution centered at 3T, and a component over shorter mark lengths. The latter component is a distribution curve generated because of abnormal crystal growth. This short-mark component increases errors at the time of reproduction, resulting in a significant reduction in the reliability of reproduction.

The occurrence of such abnormal crystal growth is known to depend largely on both the write strategy and recording speed. To be more specific, this may be because the recording layer follows a temperature history that allows abnormal crystal growth to occur if the relationship between the scanning speed and the length of cooling pulse falls within a specific range. For example, when recording is performed at any scanning speed from 3.3× to 8× DVD+RW recording, PI error due to abnormal crystal growth occurs in a speed range of 4× to 5×. This may be because the combination use of a write strategy, where the pulse period is about 2T, and a recording speed of 14.0 m/s to 17.9 m/s has caused the recording layer material to follow a specific temperature history.

To solve this problem, the write strategy for 4× to 5× recording was changed to a 3T strategy, and thereby errors were successfully reduced. Specifically, the degree of abnormal crystal growth was successfully reduced by changing m, the pulse number, as described below upon recording of marks with time length nT.

n=3, m=1
n=4, m=1
n=5, m=2
n=6, m=2
n=7, m=2
n=8, m=3
n=9, m=3
n=10, m=3
n=11, m=4
n=14, m=5

It can be learned that the pulse number is reduced in a case of n=4, 6, 7, 8, 9, 10, 11 and 14 when compared with the strategy 2T. It is thus possible to reduce errors by setting an n/m value high in a specific speed range.

The technology for changing a write strategy to be applied depending on the speed range is generally used: JP-A No. 2003-281722 discloses a technology for using the 2T strategy for low-speed recording, and the 3T strategy for high-speed recording. This is because the 3T strategy is advantageous in high-speed recording that involves laser driving at higher frequencies.

However, the feature of the method of the present invention for recording to an optical recording medium is that its setting is totally the opposite of what it has been; it has conventionally been suggested that a larger n/m value is more advantageous for high-speed recording, but, it is now established that, in fact, a smaller n/m value is more advantageous in light of abnormal crystal growth described above.

In the method of the present invention for recording to an optical recording medium, marks with time length nT are recorded by irradiating an optical recording medium with light of m heating pulses and m cooling pulses. Given that the irradiation powers of the heating pulse and cooling pulse are defined as Pw and Pc, respectively, the condition Pw>>Pc needs to be satisfied. In recording that is equivalent to 8×DVD+RW recording, Pc is preferably set to 0 mW to 0.5 mW whereas Pw to 20 to 45 mV. Providing a large difference between Pw and Pc values facilitates rapid cooling of the recording layer, enabling stable mark recording. Moreover, the method of the present invention for recording to an optical recording medium changes the pulse number m according to the recording speed v. Specifically, n/m, which corresponds to the average period between light emitting pulses, is changed depending on the scanning speed of recording. Note that m and n are natural numbers, and so m needs to be changed within a specific speed range. If a scanning speed v that enables recording to an optical recording medium is represented as $v_L \leq v \leq v_H$, a scanning speed $v_0$, which is unique to each optical recording medium and is represented as $v_L \leq v_0 \leq v_H$, is defined. If the pulse number is defined as $m_1$ (provided $v_L \leq v < v_0$), and defined as $m_2$ (provided $v_0 \leq v \leq v_H$), then the condition $n/m_1 \geq n/m_2$ is satisfied. Specifically, the write strategy needs to be changed depending on the speed $v_0$, which is unique to each optical recording medium.

As described above, the combination of a speed range which differs from one recording medium to another and a strategy (or n/m setting) determines whether or not abnormal crystal growth occurs. For this reason, if the speed range for an optical recording medium, which is unique to the recording medium, is represented as $v_1 \leq v \leq v_2$, the following settings can also be adopted:

$v < v_1$: pulse number=$m_2$
$v_1 \leq v < v_2$: pulse number=$m_1$
$v \geq v_2$: pulse number=$m_2$
Note: $n/m_1 \geq n/m_2$ In this way it is possible to avoid the generation of the combination of a unique speed range and pulse number.

Although any n/m range can be set depending on physical properties of a recording medium, n/m range is preferably from 2 to 5.

Furthermore, since abnormal crystal growth occurs at the end of a mark as shown in FIG. 2A, it is possible to further reduce the degree of abnormal crystal growth by controlling the length of a final cooling pulse. Specifically, it is possible to suppress the growth of abnormal crystal when the condition $T_{C1}/T > T_{C2}/T$ is satisfied (where $T_{C1}$ is the length of a final cooling pulse in a unique speed range, and $T_{C2}$ is the length of a final cooling pulse in other speed ranges.

By recording or pre-formatting on a disc any of $v_0$, $v_1$ and $v_2$, each representing a unique speed, an optical recording device can read the information to set an optimal recording condition.

According to the present invention, it is possible to set a long cooling time write strategy and to optimize the temperature history of a recording layer at the time of mark recording, preventing the recording layer from following a temperature history that leads to the frequent occurrence of abnormal crystal growth. Thus, it is made possible to realize a low error rate in a broad recording speed range.

According to the present invention, it is possible to set a long cooling time write strategy in a recording speed range where abnormal crystal growth readily occurs, as well as to set a write strategy with excellent characteristics even in a low-speed range. Thus, it is made possible to realize a low error rate in a broad recording speed range.

Moreover, according to the present invention, since a speed parameter that is unique to an optical recording medium is pre-formatted on the optical recording medium, an optical recording device can set an optimal recording condition for practicing the optical recording method of the present invention.

Hereinafter the present invention will be described in more detail on the basis of Examples and Comparative Examples. The present invention is not, however, limited to these Examples.

Example 1

Since DVD media that can support high-speed recording as fast as 20 m/s or greater are not on the market, a sample disc was prepared.

A undercoat layer, recording layer, overcoat layer, SiC layer, reflection layer and resin protection layer were sequentially formed on a DVD+RW substrate made of polycarbonate with a thickness of 0.6 mm and a diameter of 120 mm, and another substrate was then bonded to the reflection layer using an adhesive to prepare a DVD+RW disc.

A spiral continuous groove had already been transferred to the substrate, and the shape of the guide groove was measured using diffracted light: the track pitch was 0.74 µm and the groove depth was 30 nm.

As the undercoat layer, a mixture of ZnS and $SiO_2$ was deposited on the substrate by RF magnetron sputtering. Under the same condition, the mixture was deposited on an aluminum (Al) vapor-deposited film, and the thickness of the resultant layer was determined to be 60 nm by spectroscopic ellipsometry. In addition, the composition of the layer was measured using an electron probe micro analyzer (EPMA): the ratio between ZnS and $SiO_2$ was 80:20 (molar ratio).

The undercoat layer serves to prevent the diffusion of elements of the recording layer material to the substrate side, which is caused as a result of melting and solidification of the recording layer due to repetitive recording and rewriting, and to protect a resin substrate from thermal damage. It is possible to increase durability for repetitive recording by increasing the thickness of the undercoat layer. It, however, requires a longer deposition time, thus resulting in poor productivity. In addition, the reflectivity of a disc varies with the thickness of the undercoat layer. Thus, the optimal thickness of the layer needs to be determined based on the desired reflectivity and durability for repetitive recording. In this Example the thickness of the undercoat layer was selected so that the reflectivity was minimum in order to keep high recording sensitivity and modulation degree.

For the recording layer, Ga—Sb—Sn—Ge alloy was formed on the undercoat layer by magnetron sputtering. Under the same condition, a Ga—Sb—Sn—Ge alloy film was deposited on an aluminum (Al) vapor-deposited film, and the thickness of the resultant layer was determined to be 15 nm by spectroscopic ellipsometry. Likewise, the composition of the layer was measured using an electron probe micro analyzer (EPMA). The composition was determined to be $Ga_{0.05}Sb_{0.70}Sn_{0.17}Ge_{0.08}$, which was adjusted so as to keep the optimal crystallization rate. If the amount of Sb is increased, the crystallization rate can be further increased, and it is possible to transform the recording layer material from an amorphous state into a crystalline state even at high speeds (scanning speeds). It becomes, on the other hand, difficult to ensure sufficiently large recording marks because recrystallization tends to occur easily. As a result, a higher recording power (irradiation power Pw for heating pulse) is required in order to enlarge recording marks. At a recording speed as fast as 8×DVD+RW recording (equivalent to a scanning speed of 27.9 m/s), the amount of Sb is preferably in a range of 0.60 to 0.80 on an atomic ratio basis. Ga and Ge are added in order to stabilize the amorphous state. By increasing the amounts of these elements, the amorphous state becomes stable at around room temperature, and it is thus possible to increase the data storage life. It becomes, however, difficult to crystallize the recording layer material if their amounts are increased, and thereby an initialization operation (an operation to transform a freshly formed film from an amorphous state into a crystalline state) is complicated. The appropriate amount of each of these elements to be added is in a range of 0.03 to 0.10 on an atomic ratio basis.

Moreover, the recording layer material can be selected from materials with desired thermal and optical characteristics. For example, Ge—Sb—Sn alloy, Ge—In—Sb—Sn alloy, Ge—Sb—Sn—Te alloy or the like can be used.

As the overcoat layer, a material which is the same as the undercoat layer material was formed on the recording layer. The thickness measurement was made for the overcoat layer in a similar way as for the undercoat layer: the thickness was 7 nm.

The overcoat layer serves to prevent the diffusion of recording layer elements to the reflection layer, which is caused as a result of melting and solidification of the recording layer, and to prevent the occurrence of chemical reactions between the recording layer material and the adjacent layer material. In addition, the overcoat layer serves to control heat dissipation in the reflection layer. The optimal thickness of the overcoat layer is determined according to the thermophysical properties of the recording layer material (e.g., thermal conductivity, thermal capacity, crystallization temperature, and melting point). Increasing the thickness of the overcoat layer can reduce the amount of heat dissipating into the reflection layer, thereby allowing the recording layer to melt readily. It becomes, on the other hand, difficult to rapidly cool the recording layer and to transform it from a crystalline state into an amorphous state, whereby crystallization is facilitated. Reducing the thickness of the overcoat layer facilitates heat dissipation, and therefore, a higher irradiation power is required to melt the recording layer. It becomes, on the other hand, possible to rapidly cool the recording layer into an amorphous state. Thus, crystallization of the recording layer becomes difficult. To support recording and rewriting of this Example, each is equivalent to 8×DVD+RW recording/rewriting speed, the recording layer preferably has a thickness of 5 nm to 11 nm; if the thickness goes out of this range, it is highly likely that the recording layer has poor recording sensitivity and modulation degree.

For the overcoat layer material, an optimal material with desired thermal and optical characteristics can be used, as described above. Dielectric materials are preferably used; general oxides, sulfides, nitrides or carbonates can be used singly or as an admixture.

The SiC layer was formed on the overcoat layer in order to protect the reflection layer from corrosion. The Sic layer serves to prevent the occurrence of chemical reactions between the reflection layer and overcoat layer. If ZnS is used for the overcoat layer, S is liberated from the layer and dissipated, and it may react with certain materials of the reflection layer. In particular, the reflection layer will be sulfurized if Ag or an alloy consisting mainly of Ag is used for it, resulting in greater possibility that the reliability of media is reduced. To avoid this, a corrosion protection layer needs to be provided. Any material of any thickness can be used as long as it has an effect of protecting Ag from corrosion. In this Example SiC was used in view of solidity of film as well as of its reactivity with Ag.

The SiC layer was formed by DC magnetron sputtering as was the recording layer, followed by measurement of the thickness through a similar way as used for the recording layer. The thickness of the SiC layer was determined to be 6 nm, which is enough to protect Ag from corrosion.

As the reflection layer, Ag was provided on the SiC layer. Under the same condition, Ag was provided on a resin substrate. Using an X-ray fluorescence analyzer, the thickness of the substrate was determined to be 200 nm.

Although any material with sufficient mirror reflectivity can be used for the reflection layer material, metals or alloys are preferably used. Furthermore, the reflection layer serves to reflect reproduction light and to efficiently dissipate heat that is applied to the recording layer at the time of recording and rewriting. For this reason, the reflection layer material needs to be selected from materials with optimal thermal and optical characteristics, depending on the recording layer material and recording conditions (scanning speed, irradiation power, and minimum marks). In particular, media employing Mark Edge recording for information recording, such as CD-RW and DVD±R, are highly susceptible to thermal conductivity. Using a material with high thermal conductivity allows the recording layer to easily cool rapidly, and heat is dissipated mainly in the direction in which the layers are formed, whereby the amount of heat dissipated in one plane is reduced. Thus, it is made possible to control the irradiation power to determine the region to be melt or recrystallized, and to control the mark size with a high degree of definition, leading to a reduction in jitter after recording. In addition, using a material with high thermal conductivity also allows the recording layer to cool rapidly and to readily transform into the amorphous state. Thus, it is made possible to increase the recording sensitivity. These effects are, however, intertwined with the physical properties and thickness of the overcoat layer. If the overcoat layer is made thin, it becomes hard for the recording layer to melt because a large amount of heat is dissipated. For this reason, the reflection layer material needs to be selected with the thickness of the overcoat layer also taken into consideration.

Alloying is the easiest way to control the thermal conductivity of the reflection layer material. For example, fine adjustment of thermal conductivity can be realized by the addition of 1 atomic % or less of another element to Ag.

In this Example recording speed, which is equivalent to 8× DVD+RW recording (minimum mark length: 400 nm, scanning speed for recording: 27.9 m/s), is focused. Thus, Ag with a purity of 99.99 atomic % was used under this condition.

These laminated layers were all made thin and, therefore, were vulnerable to physical and chemical damage from outside sources. To solve this problem, a resin protection layer was provided to protect them from such damage.

A general UV curing resin for optical discs was used for the resin protection layer material. The UV curing resin was applied onto the reflection layer by spin coating, and was exposed to UV light for curing. Using an interferometric spectrometer, the thickness of the resin protection layer was determined to be about 10 μm.

Although any material can be used for the resin protection layer, material selection needs to be made with the adhesiveness to the reflection layer and the reactivity with the reflection layer taken into consideration. Moreover, if a material with high thermal shrinkage is used, the thin laminate undergoes stress and may fall off. Thus, the resin protection material needs to be selected with these properties taken fully into consideration. In this Example SD318 was used, a UV curing resin for optical discs (produced by Dainippon Ink and Chemicals, Inc.).

Since the thickness of the prepared sample disc was 0.6 mm, a substrate of 0.6 mm thickness was bonded to the resin protection layer of the sample disc to prepare a disc complying with the standard for DVD shape. For this substrate, a substrate with a groove described above was used. They were bonded together with a commercially available adhesive for DVD (UV curing type).

The adhesive was applied onto the resin protection layer by spin coating to bond the two substrates together, and the adhesive was irradiated with UV light to be cured. The disc thus prepared was found to fully satisfy the standard for DVD shape.

A gas phase method is employed to form the recording layer, meaning that the phase-change material in the recording layer is rapidly cooling into the amorphous state entirely. Thus, since the reflectivity of the recording layer at 660 nm wavelength is reduced to 10% or less, the recording layer needs to be crystallized at the recording region in order to comply with the DVD+RW standard (non-recorded state reflectivity: 18% or more, recording polarity: High to Low). This operation is referred to as "initialization".

Although any initialization method can be employed, the following method is generally used: high-output, large diameter laser light is focused around the recording layer, and the recording layer is irradiated and scanned with the laser light to melt, followed by recrystallization.

In this Example the recording layer was initialized using a phase-change optical disc initializer manufactured by Hitachi Computer Peripherals Co., Ltd. For light source, a semiconductor laser (810 nm wavelength, 1600 mW) was used. For optical system, a NA0.60 objective lens was used. The beam shape at the vicinity of the recording layer was ellipse: 1 μm in the scanning direction, and 75 μm in the direction orthogonal to the scanning direction. This beam was then applied onto the disc in a spiral manner at a scanning speed of 20.0 m/s, with a travel distance being 45 μm in the radial direction per revolution. In this way the entire recording region of the disc was initialized.

The prepared disc was such an excellent disc as to satisfy various DVD+RW standards, with non-recorded state reflectivity of 25%. Recording and reproducing experiments were then made using this disc.

For recording evaluation, a DVDR+RW tester (DDU1000, manufactured by Pulstec Industry Inc.) was used. The optical pickup used for recording and reproducing is as follows:

Wavelength: 659 nm

Objective lens NA: 0.65

Irradiation power for reproduction: 0.7 mW

Irradiation power for recording: 1.0 mW to 40.0 mW

Moreover, scanning speed can be set within a range of 3.49 m/s to 42.0 m/s.

A data generator DTG5027 manufactured by Tectronics Co. was used for the preparation of write strategies, and experiments were made within a recording speed range of 8× to 3.3× using the settings shown in Table 1. This speed range is the minimum requirement to achieve CAV recording for 120 mm-diameter discs. The write strategies used are also shown in Table 1.

TABLE 1

| Recording speed | Scanning speed (m/s) | Write strategy | Clock cycle (ns) |
|---|---|---|---|
| 8x | 27.9 | 2T | 4.8 |
| 7x | 24.4 | 2T | 5.5 |
| 6x | 20.9 | 2T | 6.4 |
| 5x | 17.5 | 3T | 7.6 |
| 4x | 14.0 | 3T | 9.6 |
| 3.3x | 11.5 | 3T | 11.6 |

The 2T strategy and 3T strategy used herein record marks of nT length by irradiating the disc with light of m heating pulses and m cooling pulses: a write strategy with an average pulse period of about 2T is referred to as the "2T strategy" and a write strategy with an average pulse period of about 3T the "3T strategy".

The relationships between n and m in this Example are shown in Table 2 below.

TABLE 2

| 2T strategy | | | 3T strategy | | |
|---|---|---|---|---|---|
| n | m | n/m | n | m | n/m |
| 3 | 1 | 3.0 | 3 | 1 | 3.0 |
| 4 | 2 | 2.0 | 4 | 1 | 4.0 |
| 5 | 2 | 2.5 | 5 | 2 | 2.5 |
| 6 | 3 | 2.0 | 6 | 2 | 3.0 |
| 7 | 3 | 2.3 | 7 | 2 | 3.5 |
| 8 | 4 | 2.0 | 8 | 3 | 2.7 |
| 9 | 4 | 2.3 | 9 | 3 | 3.0 |
| 10 | 5 | 2.0 | 10 | 3 | 3.3 |
| 11 | 5 | 2.2 | 11 | 4 | 2.8 |
| 14 | 7 | 2.0 | 14 | 5 | 2.8 |
| Average period | | 2.2 | Average period | | 3.1 |

Here the average period is the average of n/m values. In the 2T strategy the average n/m value is 2.2, which means that the period between light emitting pulses is 2.2T. By contrast, the period between light emitting pulses is 3.1T in the 3T strategy.

Figure 4:
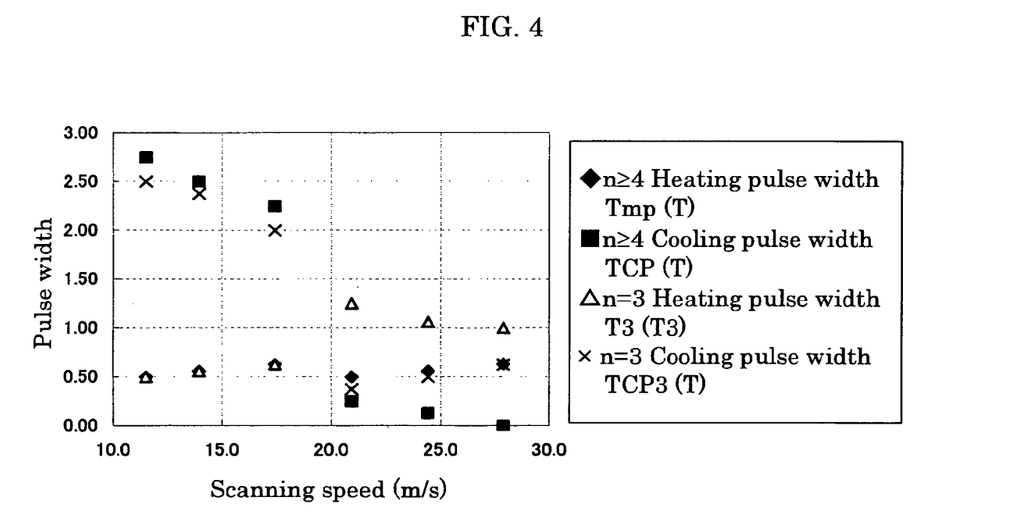
FIG. 4 is a graph showing the heating pulse widths and cooling pulse widths in Example 1.

The 3T strategy is therefore employed for recording at a scanning speed of 17.5 m/s or less because in this write strategy the period between light emitting pulses is long. In this way it is made possible to elongate the cooling pulse period at lower speeds and thus to reduce the degree of abnormal recrystallization. The set values for the heating pulse and cooling pulse are shown in Table 3, and are shown in graph form in FIG. 4. Note that in this Example the scanning speed $v_0$, which is unique to each optical recording medium, is 17.5 m/s.

TABLE 3

| Recording speed | Scanning speed (m/s) | n ≧ 4 Heating pulse width Tmp (T) | n ≧ 4 Cooling pulse width TCP (T) | n = 3 Heating pulse width T3 (T) | n = 3 Cooling pulse width TCP3 (T) |
| --- | --- | --- | --- | --- | --- |
| 8x  | 27.9 | 0.63 | 0.00 | 1.00 | 0.63 |
| 7x  | 24.4 | 0.56 | 0.13 | 1.06 | 0.50 |
| 6x  | 20.9 | 0.50 | 0.25 | 1.25 | 0.38 |
| 5x  | 17.5 | 0.63 | 2.25 | 0.63 | 2.00 |
| 4x  | 14.0 | 0.56 | 2.50 | 0.56 | 2.38 |
| 3.3x | 11.5 | 0.50 | 2.75 | 0.50 | 2.50 |

Figure 5:
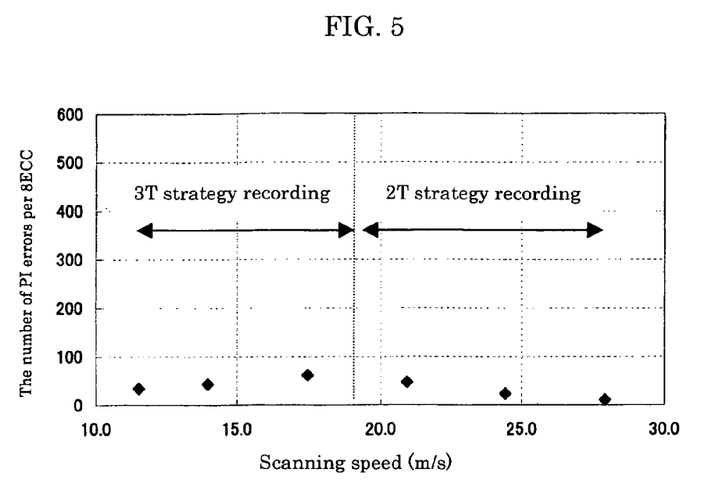
FIG. 5 is a graph showing the result of PI error measurement, performed after recording for every recording speed by using predetermined set values of the heating pulse and cooling pulse in Example 1.

Subsequently, recording experiments were made for each recording speed (or scanning speed) and the number of PI errors occurred was measured. The obtained results are shown in FIG. 5. The results were turned out to be excellent because the number of PI errors in a speed range from 11.5 m/s to 27.9 m/s was far below 280, as required by the PI error standard.

Thus, as shown in Tables 1 and 2, excellent characteristics were successfully obtained in a broad scanning speed range by setting n/m, which corresponds to the average period between light emitting pulses, as high as 3.1 in the scanning speed range of 17.5 m/s or less.

Comparative Example 1

Figure 6:
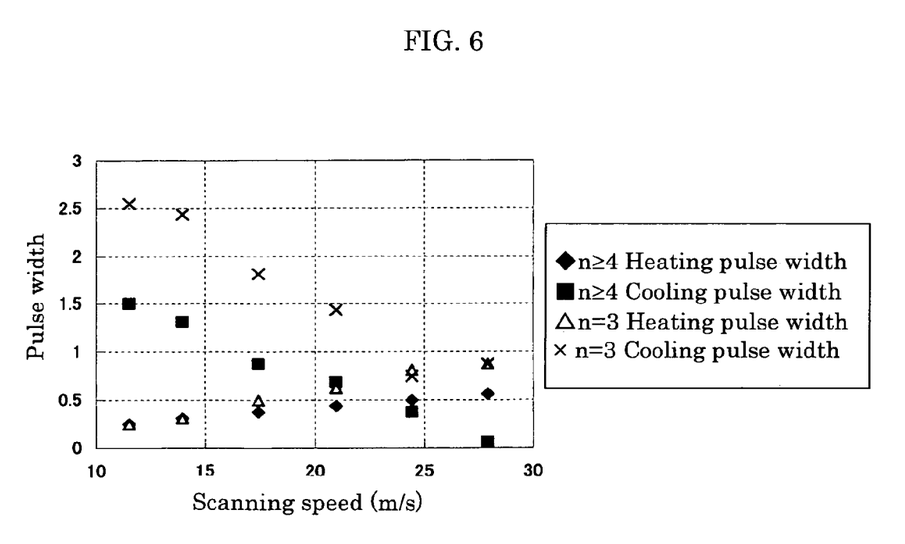
FIG. 6 is a graph showing the heating pulse widths and cooling pulse widths in Comparative Example 1.

The disc prepared in Example 1 was evaluated using a similar apparatus as that used in Example 1. Note that the 2T strategy was employed over an entire speed range from 3.3× to 8×. In addition, as shown in FIG. 6, the heating pulse widths and cooling pulse widths were linearly interpolated with respect to the scanning speed.

Figure 7:
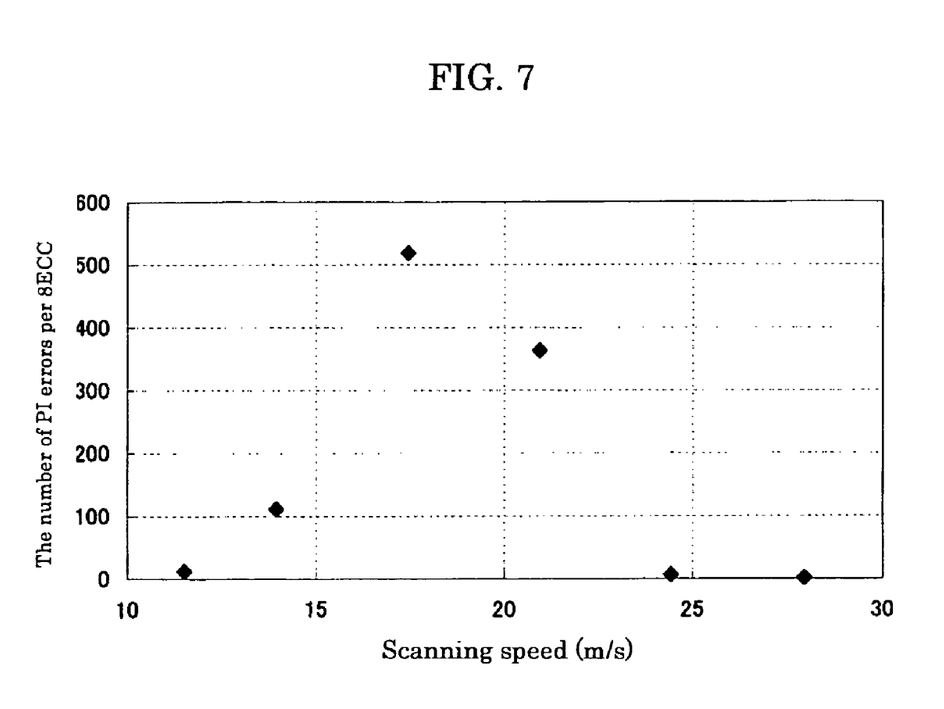
FIG. 7 is a graph showing the result of error measurement in Comparative Example.

The number of errors occurred in this write strategy was measured. The measurement result is shown in FIG. 7. In this drawing the number of PI errors exceeds 100 in the scanning speed range of 14.0 m/s to 20.9 m/s. Among other scanning speeds, the number of PI errors exceeds 500 and PO Fail error occurred at 17.5 m/s, suggesting that the number of errors dramatically increases in an intermediate speed range in a recording method where n/m is constant over an entire speed range.

The number of PI errors at 3.3× (or 11.5 m/s) in Comparative Example 1 is smaller than in Example 1 (see FIGS. 5 and 7). Thus, it is established that using the 2T strategy in a scanning speed range of below 11.5 m/s can further reduce the errors.

Example 2

The disc was evaluated in a similar way as in Example 1, with exception that the scanning speeds were set as follows based on the results of Example 1 and Comparative Example 1.

Scanning speed: 11.5 m/s for 2T strategy

Scanning speed: 11.5 m/s to 17.5 m/s (not inclusive) for 3T strategy

Scanning speed: 17.5 m/s to 27.9 m/s for 3T strategy

As a result, the number of PI errors was successfully reduced compared to Example 1. It was established from this fact that it is possible to significantly reduce the number of PI errors by setting n/m high only within a specific speed range. Note that in this Example the scanning speeds $v_1$ and $v_2$, which are unique to each optical recording medium, are 11.5 m/s and 17.5 m/s, respectively.

Example 3

A sample disc was prepared in a similar way as in Example 1, with exception that the composition of the recording layer material was changed to $Ga_{0.04}$—$Sb_{0.71}$—$Sn_{0.20}$—$Ge_{0.05}$. The prepared sample disc was written at a scanning speed of 41.8 m/s, equivalent to 12×DVD-RW recording. At this time, the write strategy for 8× recording speed (2T strategy) set in Example 1 was employed; its clock cycle was, however, set to that for 12×. The number of PI errors was measured to be below 100.

Likewise, the sample disc was written at a scanning speed of 17.5 m/s, which is equivalent to 5×. At this time, the 3T strategy for 4× set in Example 1 was employed. The number of PI errors was measured to be below 120.

It was confirmed that effects that are similar to those obtained in Example 1 can be obtained even when a recording layer material that supports much higher-speed recording is used and the recording speed is relatively set to high.

Example 4 and Comparative Example 2

Optical recording media were prepared in the same manner as in Example 1. Prepared optical recording media were as follows: a disc in which information indicating $v_0$ is pre-formatted in the ADIP information in the DVD+RW substrate, and a disc in which such information is not pre-formatted. The information was pre-formatted in the ADIP in accordance with the DVD+RW Standard—the "14 Track Format" stipulated in the ECMA-337 Standard, an international standard. In a DVD+RW disc it is possible to pre-format 256 bytes information which concerns, for example, its physical properties. According to the ECMA-337 Standard, byte0 to byte 95, corresponding to 96 bytes, are used, and no information is assigned to the rest; in this Example byte96 was used as information indicating $v_0$. Since $v_0$ is 17.5 m/s in Example 1, the value of byte 96 was set as follows:

For Disc 1 with pre-formatted information (Example 4)

Set value: 175 (in decimal), i.e., AFh (or AF in hexadecimal);

For Disc 2 with no pre-formatted information (Comparative Example 2)

Set value: 0 (in decimal), i.e., 00h (or AF in hexadecimal)

The evaluation apparatus used in Example 1 has a function of decoding the ADIP. Thus, a program that reads the value of byte96 to set a write strategy was prepared. To be more specific, the program was configured to set the write strategy in Example 1 if byte96 is 175 (in decimal), and set the write strategy in Comparative Example 1 if byte 96 is not 175 (in decimal).

After executing this program and observing its operation, the same effect as in Example 1 was obtained for Disc 1, and the same effect as in Comparative Example 1 was obtained for Disc 2. That is, pre-formatting information concerning $v_0$ in a disc made correct recording condition setting possible. Although $m_1$ and $m_2$, the number of pulses, were also set along with $v_0$ by this program in this Example, it can be easily expected that a similar operation can also be realized by setting these parameters separately.

What is claimed is:

1. A method of recording to an optical recording medium comprising:

recording a mark of time length nT (where n is a natural number of 3 or more, and T represents a clock cycle) in an optical recording medium which can support different recording speeds and has a constant information line density, and irradiating the optical recording medium, the optical recording medium being irradiated with light of alternating $m_1$ heating pulses of power Pw and $m_1$ cooling pulses of power Pc (where $m_1$ is a natural number smaller than n) provided $v<v_0$ (where v is a scanning speed and $v_0$ is a scanning speed which is unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_0$, wherein an average of $n/m_1$ values and an average of $n/m_2$ values satisfy the condition that the average of $n/m_1$ values>the average of $n/m_2$ values.

2. The method of recording to an optical recording medium according to claim 1, wherein the condition $T_{C1}/T > T_{C2}/T$ is satisfied if a final cooling pulse time (provided $v<v_0$) is defined as $T_{C1}$ and a final cooling pulse time (provided $v \geq v_0$) is defined as $T_{C2}$.

3. The method of recording to an optical recording medium according to claim 1, wherein a substrate of the optical recording medium has a guide groove in which information that allows at least one of $v_0$, $m_1$ and $m_2$ to be univocally determined is pre-formatted.

4. An optical recording medium comprising: a substrate and a recording layer disposed on the substrate, the optical recording medium being used for a method of recording to an optical recording medium, the method including:

recording a mark of time length nT (where n is a natural number of 3 or more, and T represents a clock cycle) in an optical recording medium which can support different recording speeds and has a constant information line density, the optical recording medium being irradiated with light of alternating $m_1$ heating pulses of power Pw and $m_1$ cooling pulses of power Pc (where $m_1$ is a natural number smaller than n) provided $v<v_0$ (where v is a scanning speed and $v_0$ is a scanning speed which is unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_0$, wherein an average of $n/m_1$ values and an average of $n/m_2$ values satisfy the condition that the average of $n/m_1$ values>the average of $n/m_2$ values, and wherein the substrate has a guide groove in which information that allows at least one of $v_0$, $m_1$ and $m_2$ to be univocally determined is pre-formatted.

5. The optical recording medium according to claim 4, wherein the recording layer comprises a phase-change material.

6. The optical recording medium according to claim 5, wherein the phase-change material is any one of Ge—Sb—Sn alloy, Ge—In—Sb—Sn alloy and Ge—Sb—Sn—Te alloy.

7. A method of recording to an optical recording medium comprising:

recording a mark of time length nT (where n is a natural number of 3 or more, and T represents a clock cycle) in an optical recording medium which can support different recording speeds and has a constant information line density, the optical recording medium being irradiated with light of alternating $m_1$ heating pulses of power Pw and $m_1$ cooling pulses of power Pc (where $m_1$ is a natural number smaller than n) provided $v_1 \leq v < v_2$, (where v is a scanning speed, and $v_1$ and $v_2$ are scanning speeds which are unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_2$ and $v<v_1$, wherein an average of $n/m_1$ values and an average of $n/m_2$ values satisfy the condition that the average of $n/m_1$ values>the average of $n/m_2$ values.

8. The method of recording to an optical recording medium according to claim 7, wherein the condition $T_{C1}/T > T_{C2}/T$ is satisfied if a final cooling pulse time (provided $v_1 \leq v<v_2$) is defined as $T_{C1}$ and a final cooling pulse time (provided $v \geq v_2$ and $v<v_1$) is defined as $T_{C2}$.

9. The method of recording to an optical recording medium according to claim 7, wherein a substrate of the optical recording medium has a guide groove in which information that allows at least one of $v_1$, $v_2$, $m_1$ and $m_2$ to be univocally determined is pre-formatted.

10. An optical recording medium comprising: a substrate and a recording layer disposed on the substrate, the optical recording medium being used for a method of recording to an optical recording medium, the method including:

recording a mark of time length nT (where n is a natural number of 3 or more, and T represents a clock cycle) in an optical recording medium which can support different recording speeds and has a constant information line density, the optical recording medium being irradiated with light of alternating $m_1$ heating pulses of power Pw and $m_1$ cooling pulses of power Pc (where $m_1$ is a natural number smaller than n) provided $v_1 \leq v<v_2$ (where v is a scanning speed and $v_1$ and $v_2$ are scanning speeds which are unique to each optical recording medium), the optical recording medium being irradiated with light of alternating $m_2$ heating pulses of power Pw and $m_2$ cooling pulses of power Pc (where $m_2$ is a natural number smaller than n) provided $v \geq v_2$ and $v<v_1$, wherein an average of $n/m_1$ values and an average of $n/m_2$ values satisfy the condition that the average of $n/m_1$ values>the average of $n/m_2$ values,
wherein the substrate has a guide groove in which information that allows at least one of $v_1$, $v_2$, $m_1$ and $m_2$ to be univocally determined is pre-formatted.

11. The optical recording medium according to claim 10, wherein the recording layer comprises a phase-change material.

12. The optical recording medium according to claim 11, wherein the phase-change material is any one of Ge—Sb—Sn alloy, Ge—In—Sb—Sn alloy and Ge—Sb—Sn—Te alloy.

13. The method of claim 3, wherein said information allowing at least one of $v_0$, $m_1$ and $m_2$ to be univocally determined is pre-formatted in Address in Pregroove (ADIP) information in the substrate of the optical recording medium.

14. The method of claim 2, wherein said final cooling pulse time is set at said value $T_{C1}$ when $v<v_0$, and wherein said final cooling pulse time is set at said value $T_{C2}$ when $v \geq v_0$.

15. The method of claim 1, wherein said optical recording medium is irradiated with said light of alternating $m_1$ heating pulses of power Pw and $m_1$ cooling pulses of power Pc provided $v<v_0$, and said optical recording medium is irradiated with said light of alternating $m_2$ heating pulses of power Pw and $m_2$ cooling pulses of power Pc provided $v \geq v_0$, wherein the condition $m_1 \leq m_2$ is satisfied.

* * * * *